F. J. COX.
CARBURETER.
APPLICATION FILED NOV. 29, 1907.
969,941.
Patented Sept. 13, 1910.
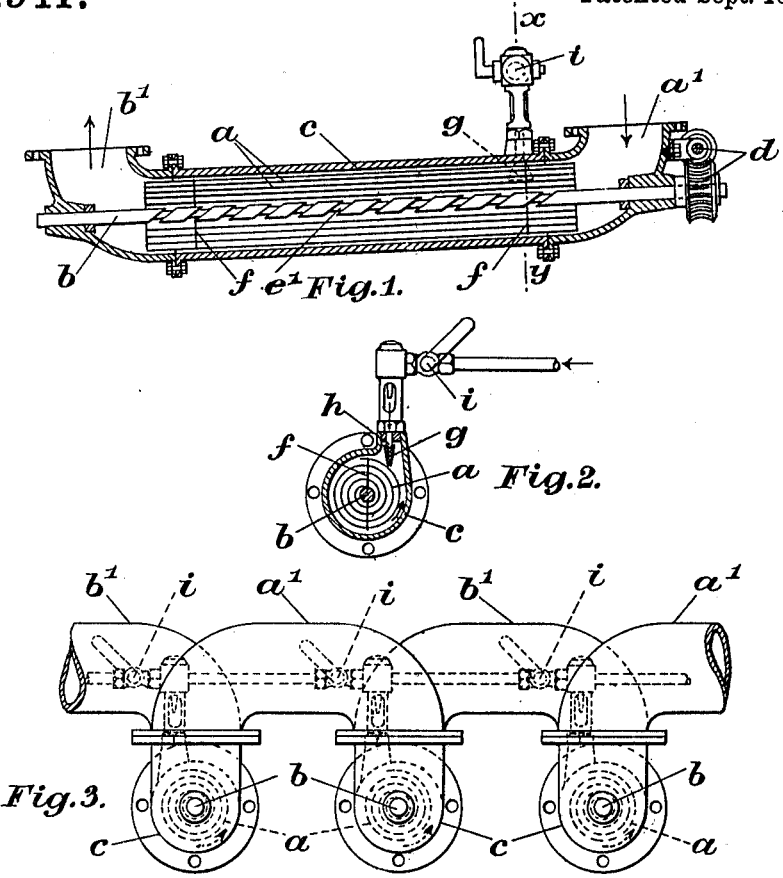

UNITED STATES PATENT OFFICE.

FREDERICK JOHN COX, OF KENTISH TOWN, LONDON, ENGLAND.

CARBURETER.

969,941.  Specification of Letters Patent.  Patented Sept. 13, 1910.

Application filed November 29, 1907. Serial No. 404,306.

*To all whom it may concern:*

Be it known that I, FREDERICK JOHN COX, a subject of the King of Great Britain and Ireland, residing at 43 and 45 Fortess road, Kentish Town, London, N. W., have invented certain new and useful Improvements in and Relating to Carbureters, of which the following is a specification.

This invention relates to carbureters for use in gas making apparatus, for internal combustion engines and for other purposes and has for its object to provide a carbureter which shall be effective to secure complete carburization and in which flooding is precluded.

The invention is illustrated in the accompanying drawings, in which—

Figure 1 is a sectional elevation of a carbureter provided according to the invention. Fig. 2 is a transverse section on the line $x$—$y$ Fig. 1. Fig. 3 is an end elevation of a series of such carbureters.

According to the invention as illustrated in Figs. 1 to 3 I deposit the volatile hydrocarbon upon a rotating spiral screen or gauze $a$ mounted on a shaft $b$ within a suitable casing $c$ in such a manner that the liquid is caused gradually to travel toward the shaft $b$ which forms the center of the spiral screen, and as the axis of the spiral screen $a$ or of the shaft upon which it is mounted is downwardly inclined as shown in Fig. 1 the liquid deposited upon the screen $a$ tends to take a spiral path so that thus the liquid becomes distributed over the whole surface of the spiral screen or gauze. Air is caused to pass through the casing from the inlet $a'$ to the outlet $b'$ in the direction of the axis of the spiral screen $a$ as shown by the arrows in Fig. 1 and may be pased through any desired number of such casings in series as shown in Fig. 3 of the drawings.

The shaft $b$ supporting the spiral screen may be rotated by any suitable means such as a worm and worm wheel gear $d$. Any suitable means such as rods $f$ attached to the shaft $b$ may be employed for keeping the various convolutions of the screen $a$ in position. By suitably regulating the flow of liquid and the air supply I can by these means secure complete volatilization.

The shaft is preferably provided with screw threads $e'$ so inclined as to feed forward any liquid hydrocarbon which reaches the shaft toward the upper end of the casing. It will be understood that the required direction of rotation of the shaft when the inclination of the screw threads is as shown in Fig. 1 is indicated by the arrows in Fig. 3.

I preferably mount a conical gauze $g$ upon the end of the jet $h$ by which the volatile hydrocarbon is fed to the screen or gauze $a$ so that the liquid may be more evenly distributed on the screen, a cock $i$ being provided to regulate the supply of the volatile hydrocarbon. I may corrugate or flute the screen gauze or other surface employed.

It will thus be understood that the invention covers generally the use in carbureters of a rotating spirally wound surface or the like for the deposition and distribution of the volatile liquid thereon in the manner and substantially as described.

What I claim as my invention and desire to secure by Letters Patent is:—

1. A carbureter consisting of a casing having an air inlet and a mixture outlet, an involute spiral surface within the casing, a jet from which a volatile liquid is discharged upon the said involute spiral surface, and means for rotating the spiral surface so as to cause the volatile liquid to gradually move toward the axis of the involute spiral surface substantially as described.

2. A carbureter consisting of a casing having an air inlet and a mixture outlet, an involute spiral surface of reticulated substance, mounted within the casing, a spindle upon which said surface is mounted, means for causing the rotation of the said spindle and the involute spiral surface in the direction to cause the passage of the volatile liquid toward the spindle, and a jet from which a volatile liquid is discharged upon the said involute spiral surface, substantially as described.

3. A carbureter consisting of a casing having an air inlet and a mixture outlet, an involute spiral surface of reticulated substance mounted within the casing, an inclined spindle upon which said surface is mounted, means for causing the rotation of the said spindle and the involute spiral surface in the direction to cause the volatile liquid to flow inwardly toward the end of spindle in a spiral path over the involute surface and a jet from which a volatile liquid is discharged upon the said involute spiral surface, substantially as described.

4. A carbureter consisting of a series of casings, connections by means of which air to be carbureted may pass therethrough in series, an involute spiral surface mounted within each of said casings respectively upon a spindle, jets through which volatile liquid is discharged upon the said spiral surface, and means for rotating the said involute spiral surface in the direction to cause the volatile liquid to pass inwardly toward the spindle, substantially as described.

5. A carbureter consisting of a series of casings slightly inclined downwardly, connections by means of which air to be carbureted may pass therethrough in series, an involute spiral surface mounted within each of said casings respectively upon a spindle, jets through which volatile liquid is discharged upon the said spiral surface, and means for rotating the said involute spiral surface in the direction to cause the volatile liquid to pass inwardly toward the spindle and in a spiral path over the surface downwardly toward the extremity of the spindle, substantially as described.

6. A carbureter consisting of an involute spiral surface, a jet from which a volatile liquid is discharged upon the said involute spiral surface, a casing having an air inlet and a mixture outlet within which the said spiral surface is mounted, said jet being mounted on the casing at the side and upper end thereof, a feed for said jet and means for its regulation substantially as described.

7. A carbureter consisting of a series of casings, connections by means of which air to be carbureted may pass therethrough in series, an involute spiral surface mounted within each of said casings respectively upon a spindle, jets through which volatile liquid is discharged upon the said spiral surface, said jets being disposed at the sides of the respective casings, and means for rotating the said involute spiral surface in the direction to cause the volatile liquid to pass inwardly toward the spindle, substantially as described.

8. A carbureter consisting of a casing, having an air inlet and a mixture outlet, an involute spiral surface of reticulated substance mounted within the casing a spindle upon which said surface is mounted, said spindle being provided with a screw thread and being inclined in a downward direction, a jet from which a volatile liquid is discharged upon the said involute spiral surface and means for causing the rotation of the spindle and involute spiral surface in the direction to cause the volatile liquid to flow in a spiral path over the surface toward the spindle the screw thread moving the volatile liquid on the spindle toward the upper end of the casing substantially as described.

9. A carbureter consisting of a casing having an air inlet and a mixture outlet, an involute spiral surface mounted within the casing, said involute spiral surface having its axis inclined downwardly, a jet from which the volatile liquid is discharged upon the involute spiral surface and means for rotating the spiral surface for the purpose of causing the volatile liquid to flow in a spiral path over the surface toward the lower extremity thereof substantially as described.

10. A carbureter consisting of a casing having an air inlet and a mixture outlet an involute spiral surface of reticulated substance mounted within the casing, a spindle upon which said surface is mounted, said spindle being inclined in a downward direction, a jet from which a volatile liquid is discharged upon the said involute spiral surface and means for rotating the spindle and involute spiral surface for the purpose of causing the volatile liquid to flow in a spiral path over the surface toward the lower extremity of the spindle substantially as described.

In testimony whereof I have hereunto signed my name to this specification in the presence of two subscribing witnesses.

FREDERICK JOHN COX.

Witnesses:
 FREDERICK COLLINS,
 F. L. RAND.